April 14, 1970 T. M. POUCH ET AL 3,506,050
NUT-PANEL ASSEMBLY AND METHOD OF INSTALLING NUT
Filed Dec. 19, 1967 3 Sheets-Sheet 1

INVENTORS
THOMAS M. POUCH
KENNETH V. YORK
BY
WILSON, SETTLE & BATCHELDER.
ATT'YS.

INVENTORS
THOMAS M. POUCH
KENNETH V. YORK
BY
WILSON, SETTLE & BATCHELDER
ATT'YS.

April 14, 1970     T. M. POUCH ET AL     3,506,050

NUT-PANEL ASSEMBLY AND METHOD OF INSTALLING NUT

Filed Dec. 19, 1967     3 Sheets-Sheet 3

INVENTORS
THOMAS M. POUCH
KENNETH V. YORK
BY
WILSON, SETTLE & BATCHELDER.
ATT'YS.

United States Patent Office 3,506,050
Patented Apr. 14, 1970

3,506,050
NUT-PANEL ASSEMBLY AND METHOD OF
INSTALLING NUT
Thomas M. Pouch, Farmington, and Kenneth V. York,
Royal Oak, Mich., assignors to Multifastener Corporation, Detroit, Mich., a corporation of Michigan
Filed Dec. 19, 1967, Ser. No. 691,902
Int. Cl. F16b 39/282
U.S. Cl. 151—41.73                              4 Claims

ABSTRACT OF THE DISCLOSURE

A pierce nut having a pilot portion extending above a face of the nut defined by two flanges disposed on opposite sides of the pilot portion and undercut grooves in the sides between the pilot ends and the respective faces of the flanges. The nut is secured to a panel by using a die button and relative movement of the three parts will initially cause the panel to be deformed to a configuration surrounding at least part of the pilot portion, whereupon the die button will pierce the panel along lines spaced inwardly from the outer edges of the pilot portion to remove a slug slightly smaller than the free end of the pilot portion. Continued relative movement of the die button and the nut will substantially simultaneously force a portion of the panel into the undercut grooves, displace a portion of the pilot portion towards the face defined by the flanges, and bottom the lower surface of the panel on the face defined by the flanges.

BACKGROUND OF THE INVENTION

The present invention relates generally to an improved nut-panel assembly and an improved method of rigidly affixing and sealing a nut to panels or plate members of varying thickness.

In the manufacture of products, such as appliances, automobiles, and the like from sheet metal panels, it is often necessary to attach adjacent panels to one another or to attach brackets or the like to a panel. To accommodate the utilization of bolts and other threaded fasteners to such assembly operations, it has been customary to secure a nut to the panel in various ways. One type of nut which has found remarkable success for this purpose is commonly know as the "pierce nut" which is illustrated in Patents Nos. 2,707,322 and 3,152,628. This type of nut serves as a punch for forming its own hole in the panel and thereafter a portion of the panel is deformed into undercut grooves defined on the nut by utilizing a die operation to affix the nut to the panel or plate.

While this type of operation has found remarkable success, the conventional manner of securing this nut in a panel, which is disclosed in Patent No. 2,707,322, requires various sizes of pierce nuts to accommodate varying thicknesses of panels or plates. Thus, it has been found necessary to provide nuts of various different configurations for the differences in thicknesses of the panels or plates to which the nuts are secured. Of course, this necessitates large inventories of various types of nuts. Obviously, substantial advantages could be obtained by utilizing a single nut structure capable of being properly secured and sealed in panels of various thicknesses. Furthermore, in securing these nuts to very thin panels additional difficulties have been encountered in properly sealing the nut in the panel.

SUMMARY OF THE INVENTION

The present method of securing the pierce nut to a panel allows the utilization of a single nut which is capable of being accurately sealed in panels of varying thickness and particularly to rather thin panels. The finished nut-panel assembly has increased resistance to forces applied in any direction.

Therefore, the primary object of the present invention is to provide an improved method of securing and sealing a nut to a relatively thin panel or plate.

Another object is to provide an improved method of securing a nut to a sheet metal panel which is readily capable of properly sealing the nut in panels of varying thicknesses to thereby utilize a single nut configuration for varying thicknesses of panels.

A further object is to provide an improved nut-panel assembly of increased retention capability.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
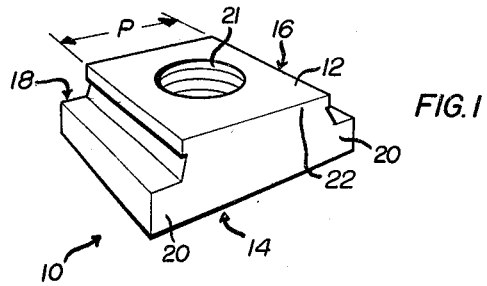
FIGURE 1 is a perspective view illustrating a nut which is to be secured to a panel.

The pierce nut or fastener 10 employed in the present invention is shown in FIGURE 1 and includes substantially parallel top and bottom faces or surfaces 12 and 14. The nut 10 is polygonal in shape, preferably rectangular, and has a pilot portion 16 extending above a face 18 defined by a pair of flanges 20 extending outwardly from opposed sides of the pilot portion. The lower surface 14 is defined by the lower surfaces of the respective flanges 20 as well as the opposite end of the pilot portion.

The polygonal pilot 16 has a threaded aperture 21 and includes vertically extending sides 22 with at least two opposed sides each having undercut grooves or recesses 24 defined therein. The undercut grooves or recesses are disposed intermediate the face or surface defined by the flanges 20 and the upper face 12 of the nut. The grooves 24 define squared or projection shoulders 26. The inner walls defining the grooves 24 may be tapered, as shown in the drawings, may be perpendicular to the surfaces defining the upper face 18 of the main body of the nut or a combination of tapered and perpendicular portions.

In the previous method of securing the nut to a panel, the nut was disposed on one side of the panel while a die button was located on the opposite side of the panel and relative movement between the die button and the nut caused the nut to pierce the panel and thereafter have the die button engage the panel adjacent the grooves to swage the metal of the panel into the grooves or recesses of the nut.

However, it has been found that when securing a particular nut of the above type to panels having varying degrees of thickness and particularly thin panels, problems have been encountered to properly seal and securely affix the nut to the panel after the nut has pierced the panel. Thus, it has been found that in securing a specific nut to very thin sheets or panels, there is not sufficient panel metal available adjacent the grooves to be adequately displaced or deformed for providing a proper seal between the nut and the panel.

According to the present invention, an improved method of securing the nuts to the panels is provided which is capable of securing nuts to very thin panels. Thus, according to the invention, this is accomplished by swaging or deforming a portion of the nut pilot towards the face of the nut body defined by the flanges after the panel has been pierced.

In the method of the present invention, a die button 40 having an opening 42 therein is utilized for securing the nut to the panel. As clearly shown in FIGURES 2, 3, and 4, the opening 42 between opposed sides 44 has a lateral dimension X which is slightly smaller than the lateral dimension P of the upper face of the pilot 16 between the two sides having the grooves located therein. The lower end of the die button 40 has spaced projections 48 each having an inclined outer wall 49, bottom wall 50 and a vertical inner wall 51 which merges with the bottom wall at a radiused corner 52.

Figure 2:
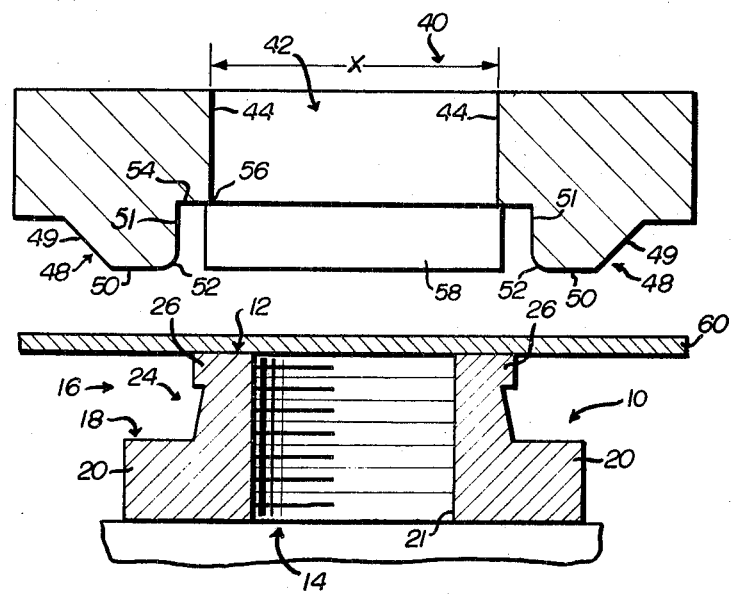
FIGURE 2 is a sectional view of the nut, shown in FIGURE 1, prior to assembly in a panel as well as a fragmentary view of a die button used in securing the nut to the panel.

As clearly shown in FIGURE 2, the inner walls 51 of the respective projections 48 are spaced outwardly of the walls 44 defining the opening 42 and a horizontal wall 54 is located between the respective vertical walls 44 and 51. The wall 54 merges at right angles with the walls 44 defining the opening 42 to thereby define piercing edges or shoulders 56 and an enlarged recess between the projections 48, for a purpose to be described later.

Additional depending projections 58 (only one being shown in FIGURE 2) are provided at points spaced slightly outwardly of the lower remaining edges of the openings 42. The projections 58 will cause the panel metal adjacent the remaining two sides 22 of the nut pilot to be forced into engagement therewith. This particular feature is important to prevent any tearing of the panel metal at the respective corners of the nut pilot during securement of the nut to the panel.

In the formation of the improved nut-panel assembly of the invention, a panel 60 is interposed between the die button 40 and the nut 10, and the nut 10 and die button 40 are then displaced relative to each other. Of course, the relative movement of the die button and the nut can be carried out in any desired manner. For example, the die button 40 can be displaced into contact with the panel 60 as the panel is supported upon the nut which in turn is restrained from any movement. Alternatively, the nut 10 can be displaced, as by a press punch towards the panel 60 and the die button held stationary in which case the nut displaces a portion of the panel disposed above the pilot.

Figure 3:
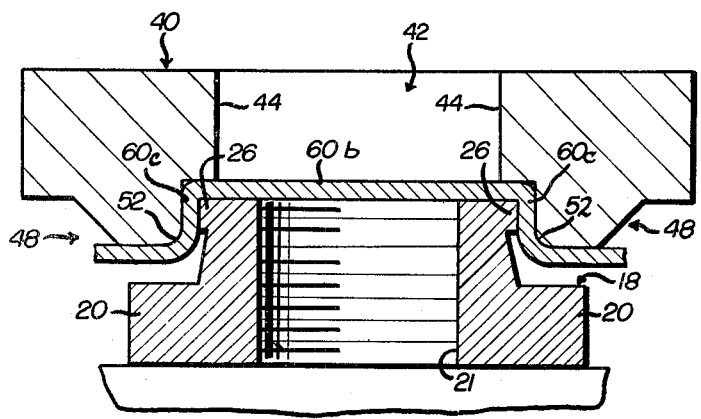
FIGURES 3 and 4 are views similar to FIGURE 2 showing the successive steps of affixing the nut to the panel.

During this movement, the panel is trapped between the die button and the nut and a sufficient force on either the die button or the nut will initially cause a deformation of a portion of the panel from the configuration shown in FIGURE 2 to a dished configuration 60b shown in FIGURE 3. As can readily be appreciated from an inspection of FIGURE 3, a portion 60c of the panel 60 is displaced from a plane defined by the main body of the panel to a position slightly above such plane without embossing the main body of the panel. The dished configuration of the panel will result from the enlarged recess in the die button between the projections 48 and the panel will engage ledges defined by the lower surface 54 of the die button.

Further relative movement of the die button 40 and the nut 10 will cause the swaging or shearing corners 56 to pierce the panel along spaced lines disposed inwardly of the outer edges of the pilot 16. As the panel is pierced by the die button, the lower surface of the panel 60 will continue its movement towards the face 18 defined by the flanges 20. Substantially simultaneous to this movement and the piercing of the panel by the die button, the shoulders 26 will be deformed or displaced towards the face 18 of the nut by the walls or shoulders 54 on the lower end of the die button. Also, during this movement the projections 48 will be in contacting engagement with the upper surface of the panel 60 and the radiused corners 52 will prevent the projections from piercing the panel.

Of course, as the shoulders 26 are moved towards the face or surface defined by the flanges 20, the relative size of the grooves or undercut recesses 24 will be decreased. Since the portions 60c of the panel, which are disposed along the sides of the pilot 16, are confined in the die recess by the projections 48, the combined action of (1) the relative movement of the die button 40 and the nut 10 towards each other and (2) the staking or deforming of the shoulders 26 towards the face 18 will cause a deforming of the portion 60c of the panel from the position and configuration shown in FIGURE 3 to that shown in FIGURE 4. Thus, as the lower surface of the panel 60 bottoms on the face 18 of the nut, the material 60c will be deformed and displaced within the grooves 24 and the width of the grooves 24 will of course be decreased while the depth will be increased due to the shearing or staking of the shoulders 26. Stated another way, a major portion of the material of the portion 60c of the panel is deformed into the undercut recesses or grooves 24 to substantially fill the grooves.

At substantially the same time, further relative movement of the die button and the nut will also cause the shoulders 26 to be deformed to thereby trap the material which is flowed into the grooves between the shoulders 26 and the upper face 18 of the flanges 20.

It should be noted that the relative dimensions of the nut, die button and panel are of extreme importance if the nut is to be properly secured and sealed in the panel. Thus, as was stated above, the width P of the nut pilot must be greater than the width X of the opening 42 in the die button. The height of the nut pilot portion above the surface 18 of the flange must be greater than the height of the projection 48 between the walls 50 and 54 of the die button. Also, the dimension between the spaced side walls 51 of the opposed projections 48 must be greater than the width of the nut pilot end face as well as the width of the opening 42 in the die button. Stated another way, the dimension between the opposed spaced side walls 51 is substantially equal to or slightly greater than the width of the nut pilot plus twice the thickness of the panel.

Figure 4:
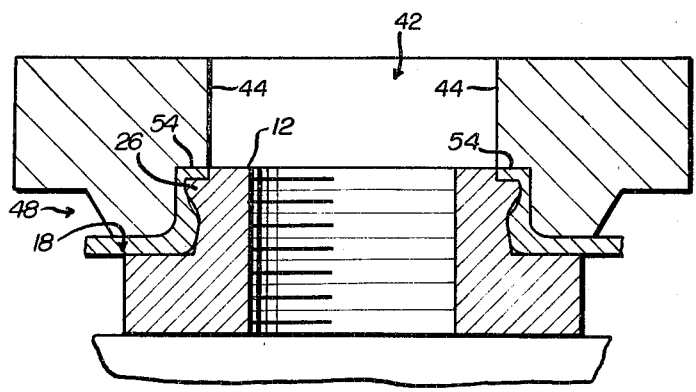
Figure 5:
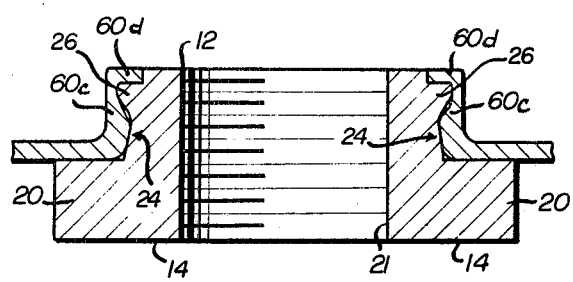
FIGURE 5 is a sectional view of the nut in its final assembled position in the panel.
Figure 6:
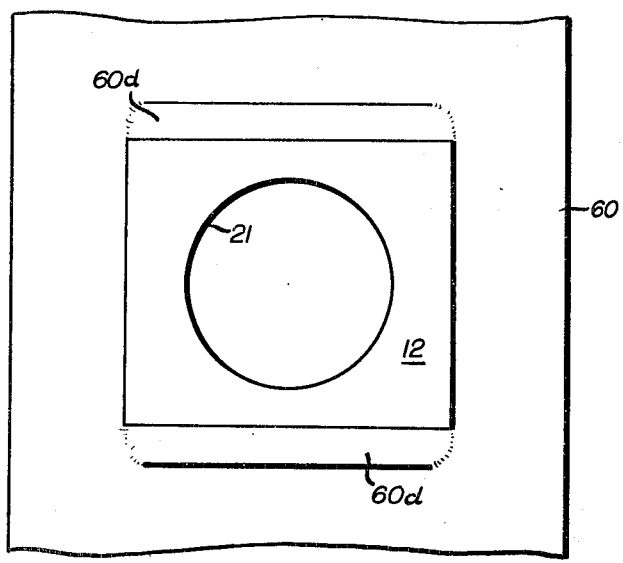
FIGURE 6 is a plan view of the nut installed in the panel.

As is readily appreciated from an inspection of FIGURES 4 and 5, by piercing or cutting the panel portion at a point spaced inwardly from the outer edges of the pilot, the panel portion 60c will be wrapped around the shoulder 26. This is extremely important in securing the nut to the panel in accordance with the present invention. Thus, the portion 60d of the panel in the final position shown in FIGURE 5 provides an additional locking and sealing between the panel and the nut. At the same time, deforming the shoulders 26 towards the face of the nut will decrease the volume of the grooves 24 to thereby allow the panel to be adequately sealed to the nut even when relatively thin panels are being used. The improved nut-panel assembly is shown in FIGURES 5 and 6 where it can clearly be seen that the nut is sealed and secured to a fairly thin panel.

A slightly modified form of panel assembly is shown in FIGURES 7 through 10. This panel assembly is particularly designed for increased retention capabilities when excess forces are applied axially of the threaded opening in the nut intending to pull the nut through the panel. Furthermore, the improved modified nut-panel assembly is capable of resisting increased shear forces which may be applied non-axially of the nut aperture.

Figure 7:
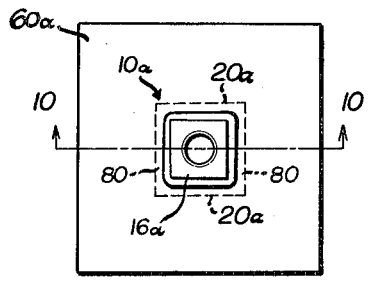
FIGURE 7 is a plan view of a modified nut and panel assembly.

The nut and panel assembly of FIGURE 7 is in many respects similar to the panel assembly shown in FIGURES 1 through 6 and like reference numerals are utilized to indicate like parts except that a suffix has been applied to the reference numerals in FIGURES 7 through 10. The improved nut 10a utilized in forming the panel assembly shown in FIGURE 7 includes the polygonal pilot portion 16a and the outwardly directed flanges 20a extending from opposite sides of the polygonal pilot. The sides of the pilot 16a adjacent the flanges 20a also include the undercut grooves (not shown in FIGURE 7) similar to the grooves shown in FIGURES 1 through 4.

However, the improved nut 10a of the modified embodiment also includes a second pair of flanges 80 extending outwardly from the remaining two sides of the rectangular pilot portion 16a. Prior to assembly, the sides 82 of the pilot 16a (similar to sides 22) adjacent the flanges 80 have undercut grooves 83 similar to grooves 24, as clearly shown in FIGURE 8, to define shoulders 81 adjacent the upper end of the pilot.

Figure 8:
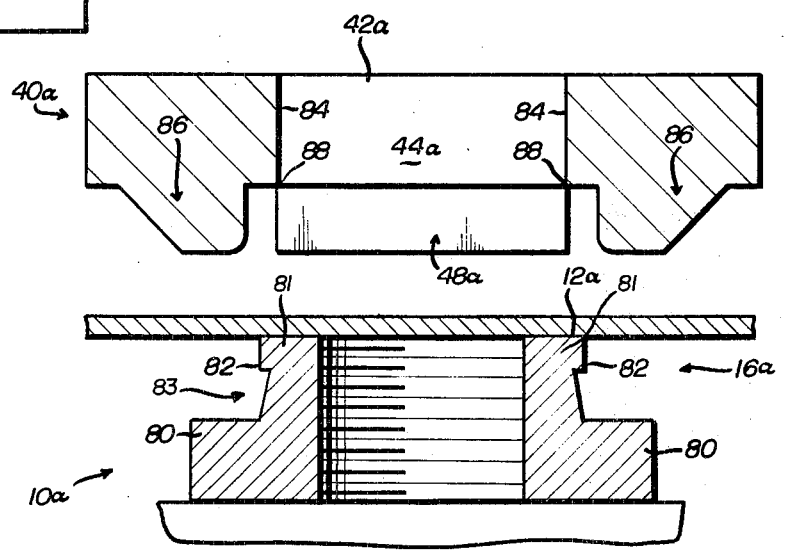
FIGURE 8 is a sectional view taken generally along lines 10—10 of FIGURE 7 showing the nut and panel with a die button prior to assembly.
Figure 9:
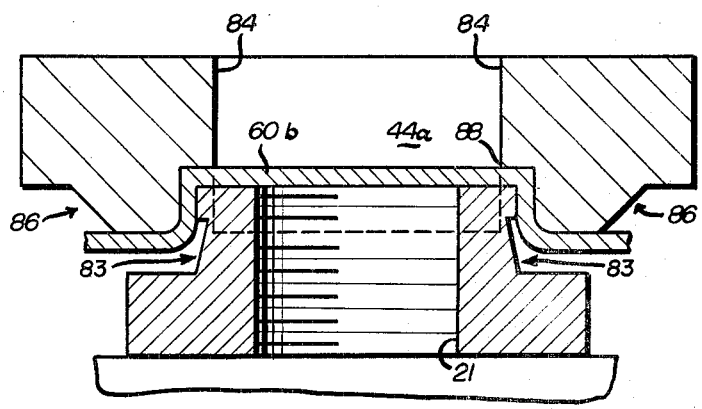
FIGURE 9 is a view similar to FIGURE 8 showing the condition of the panel during an intermediate step in assembling the nut and panel.
Figure 10:
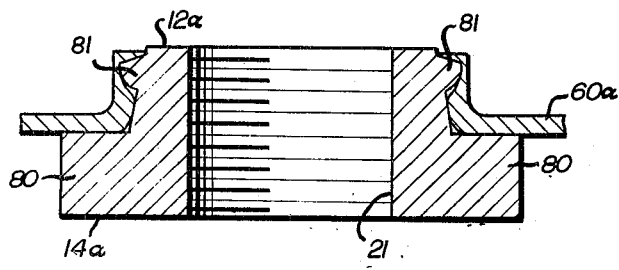
FIGURE 10 is a sectional view along lines 10—10 of FIGURE 7.

The die button 40a has an opening 42a similar to the opening 42 shown in FIGURES 2 with side walls 84 intermediate the side walls 44a and spaced from each other a distance slightly less than the length of the pilot face between the flanges 80, as clearly shown in FIGURES 8 and 9. The lower end of the die button 40a also includes a pair of spaced projections 86 disposed outwardly of the side walls 84 and identical to the projections 48a.

In the formation of the nut-panel assembly shown in FIGURE 7, the panel 60a is again deformed to define a dished portion 60b displaced from the plane defined by the main body of the panel. Of course, once the panel is in the position shown in FIGURE 9, which is similar to the position shown in FIGURE 3, further relative movement of the die button 40a and the nut 10a will cause the die button 40a to pierce the panel along the piercing edges 88 defined at the lower end of the side walls 84. From an inspection of FIGURE 9, it is readily apparent that the slug removed from the panel by the piercing of the die button is again slightly smaller than the cross-sectional dimension of the pilot between the side walls 82.

Further relative movement of the die button and nut will cause the nut to be deformed along lines defined by the edges 88 of the opening 42a. Thus, the portion or shoulders 81 of the pilot portion 16a at the juncture of the upper face 12a and the side walls 82 will be displaced downwardly and outwardly from the position shown in FIGURE 9 to the final assembled position shown in FIGURE 10. This deformation of the pilot portion of the nut will result in a trapping of a part of the deformed portion of the panel between the shoulders or projections 81. Furthermore, limiting the outward movement of the deformed portion of the panel with the inner vertical walls of the projections 86 will cause the portion of the deformed panel to surround the projections 81 and overlie a portion thereof to securely seal the nut in the panel.

Of course, the remaining two sides adjacent the flanges 20a of the nut pilot will be deformed in the manner identical to that described in the embodiment shown in FIGURES 1 through 6 and a cross-sectional view taken generally perpendicular to the lines 10—10 of FIGURE 7 would be identical to that shown in FIGURE 5.

Again the respective dimensions of the nut 10a panel 60a and die button opening 44a, as well as the projection 86, correspond to those set forth hereinabove. In fact, the projections 48a and 86 may be joined at their adjacent ends to define a continuous projection extending from the end surface of the die button and surrounding the opening 44a.

The improved nut and panel assembly shown in FIGURE 7 has greatly increased retention capabilities since the panel is deformed along all sides of the nut pilot and also is trapped between shoulders or projecting portions of the pilot and the upper surface defined by the flanges 20a and 80.

Of course, another very advantageous feature of the present methods of securing nuts to panels and the nut-panel assemblies, is the fact that the same nut may be secured to panels of varying thicknesses by merely utilizing die buttons having a recess of a size correlated to the particular thickness of the metal panel. As can readily be appreciated, this materially reduces the number of types of nuts which must be stored for being secured to panels of varying thicknesses.

It has been found that securing a nut to a panel in the manner described above will greatly increase the sealing characterization of the nut-panel assembly. In fact it has been determined that considerable positive fluid pressure on the surface of the panel can be sustained without producing leakage at the joint between the nut and panel.

While two preferred embodiments of the invention have been shown and described, it will be readily apparent to those skilled in the art that various modifications may be made without departing from the spirit of the invention.

We claim:

1. A nut and panel assembly comprising a nut body having a flat panel engaging top surface disposed in face-to-face engagement with the underside of a panel, a polygonal nut pilot integral with said nut body projecting upwardly from said top surface and having an upper end surface exposed at the upper side of said panel through an aperture in said panel, said pilot having an undercut groove in each of two opposed sides thereof, each groove having an inner wall extending along the length of the side of the pilot and extending upwardly from said top surface of said nut body to an outwardly projecting shoulder adjacent the top of said pilot, said panel being bent upwardly at the juncture of said top surface of said body to extend upwardly along the inner wall of the groove in contact therewith and thence upwardly around said shoulder.

2. A nut and panel assembly as defined in claim 1 wherein the width of the aperture in said panel is less than the width of the nut pilot at said shoulders, said panel overlying the top of said shoulders and being compressed downwardly into the top of said pilot.

3. A nut and panel assembly as defined in claim 1 wherein the exposed surface of said panel overlying the nut is curved upwardly from a horizontal surface overlying the top surface of the nut body to a substantially vertical surface extending upwardly along the sides of the pilot, the panel being deformed in its extent along the side of said pilot to place the inner surface of the panel in face-to-face contact with the inner wall of the groove and the shoulder.

4. A nut and panel assembly as defined in claim 3 wherein said inner wall of the groove is inclined inwardly and upwardly of said pilot.

References Cited

UNITED STATES PATENTS

| 1,526,375 | 2/1925 | Riegel | 285—203 |
| 2,707,322 | 5/1955 | Strain et al. | 151—41.73 |
| 3,342,366 | 9/1967 | De Fauw | 285—202 |
| 3,187,796 | 6/1965 | Double | 151—41.73 |
| 3,314,138 | 4/1967 | Double | 29—432.2 |

FOREIGN PATENTS 688,388  2/1940  Germany.

EDWARD C. ALLEN, Primary Examiner

U.S. Cl. X.R.

29—432, 243.5